United States Patent [19]

Suzuki

[11] Patent Number: 4,572,626
[45] Date of Patent: Feb. 25, 1986

[54] ELECTRIC REMOTE CONTROL BACK-MIRROR ASSEMBLY

[75] Inventor: Masaru Suzuki, Chiryu, Japan

[73] Assignee: Kabushiki Kaisha Tokai Rika Denki Seisakusho, Japan

[21] Appl. No.: 558,177

[22] Filed: Dec. 5, 1983

[51] Int. Cl.[4] .............................................. G02B 7/18
[52] U.S. Cl. .................................. 350/634; 403/115; 248/487
[58] Field of Search .............. 350/634, 633, 636, 637; 403/115, 114; 248/487

[56] References Cited

U.S. PATENT DOCUMENTS 4,324,454  4/1982  Kumai ................................. 350/634
4,365,867  12/1982  Siefert ................................ 350/634

Primary Examiner—Jon W. Henry
Attorney, Agent, or Firm—Jackson & Jones

[57] ABSTRACT

A back-mirror angle adjustment assembly, wherein a mirror holder is so held by a spherical bearing as to be freely inclined, the heads of screw rods are connected to each of the two connecting portions which are crossed at right angles with respect to an inclination center at the back face of the mirror holder, and which drives the mirror holder to be inclined by way of pushing and pulling the screw rods, and both the rooms and openings of the connecting rods are formed in a rectangular shape along a radial direction centering the spherical bearing, while the heads of the screw rods in square are inserted within the rooms so as to be maintained unrotatably and at the same time movably in relation to the mirror holder.

5 Claims, 10 Drawing Figures

ELECTRIC REMOTE CONTROL BACK-MIRROR ASSEMBLY

BACKGROUND OF THE INVENTION

This invention relates to a back-mirror for a vehicle, which is adapted to be mounted on the outside of the vehicle and connected to an operable means provided within the vehicle for controlling an angular movement of the back-mirror to provide a convenient view to a driver of the vehicle, and, more particularly, to an electric remote control back-mirror assembly for adjusting the angular movement of the back-mirror on the vehicle to the right position without causing the unstable state or deterioration among mechanisms for the movement of the back-mirror.

Since the backmirror is located out of the reach of the driver of the vehicle in the line of vision to permit the driver to observe traffic conditions behind the vehicle without shifting the driver's eyes too far out of the line of travel of the vehicle, it is necessary to provide mechanisms for moving the back-mirror to the desired positions on the vehicle through a remote controlled operation of the driver from the inside of the vehicle and, preferably, including a back-mirror assembly for adjusting the angular movement of the back-mirror into more precise positions.

Conventionally, such a construction of this type of back-mirror assembly has been known that two connecting parts which are crossed at right angles to an inclination center at the back face of a back-mirror are respectively connected with the heads of screw rods and, by pushing and pulling the screw rods to be driven by a motor, the back-mirror is inclined, as described within U.S. Pat. No. 3,609,014, patented on Sept. 28, 1971. However, in the case of the back-mirror assembly having the construction as described above, the two connecting parts move to draw a parenthesis shape with respect to the inclination center, while the screw rod moves a straight line, and consequently, the motor may be sometimes caused to be locked by an unnecessary force delivered when the back-mirror is inclined so much. In order to prevent this, it has been proposed that the screw rod is made of an elastic material such as polyurethane rubber so that the unnecessary force may be reduced owing to the transformation of the elastic screw rod, and the engagement of a driving gear into the screw rod is made use of also as a clutch. However, it cannot be prevented by the arrangement as has been proposed that the motor is loaded too much around the position where the back-mirror is inclined by the maximum angles, and moreover there has been such a problem that the elastic screw rod becomes hard when it is cold, thus losing the effectiveness thereof as an elastic body.

SUMMARY OF THE INVENTION

Accordingly, the present invention has been developed with a view to substantially eliminate the disadvantages and inconveniences inherent in the prior art remote control back-mirror for a vehicle, and has for its essential object to provide an electric remote control back-mirror assembly which can adjust, through a remote controlled operation from the inside of a vehicle, the angle of a back-mirror in a smooth and stable movement of the drive connection between a screw rod and a driving gear.

Another object of the present invention is to provide an improved electric remote control back-mirror assembly for a vehicle of the type referred to above, wherein the head of the screw rod is maintained in the connecting portion where the screw rod is connected to the mirror holder in such a manner that the head can be moved relative to the mirror holder in a radial direction centering the spherical bearing so that the respective center lines of the screw rod and the driving gear are able to be held in agreement with each other even when the mirror holder is inclined so much, and therefore no unnecessary force is added to the engaging portion, without bringing the motor into the locked condition or causing the driving systems to be slipped by operation of the clutch mechanism before the mirror is inclined to the maximum inclination postion, whereby the mirror angle adjustment assembly can always exhibit a stable movement.

A further object of the present invention is to provide an improved electric remote control back-mirror assembly for a vehicle of the type referred to above, wherein the head portion of the screw rod in the drive connection moves in relation to the mirror holder within the room of the connecting socket provided on the mirror holder so that the screw rod and the driving gear may be positioned in a relative disposition in order to always perform a favorable engagement therebetween, without adding unnecessary force on the engaging portion.

A still further object of the present invention is to provide an improved remote control back-mirror assembly for a vehicle, of the type referred to above, wherein both the rooms and openings of the two connecting sockets are formed in a rectangular shape along a radial direction centering a spherical bearing, and a head of the screw rod in square is inserted within the room of the connecting socket so as to be maintained unrotatably and at the same time movably in relation to the mirror holder in a longitudinal direction thereof.

According to the present invention, there provides a back-mirror angle adjustment assembly wherein a mirror holder is so held by a spherical bearing as to be freely inclined and the heads of screw rods are connected to each of the two connecting sockets which are provided on the mirror holder and crossed at right angles with respect to an inclination center at the back face of the mirror holder, and which drives the mirror holder to be inclined by way of pushing and pulling the screw rods, characterized in that both the room and opening of the connecting sockets are formed in a rectangular shape along a radial direction centering the spherical bearing and, the head of the screw rod in square is inserted within the room of the connecting sockets so as to be maintained unrotatably and at the same time movably in relation to the mirror holder.

BRIEF DESCRIPTION OF THE DRAWINGS

These and other objects and features of the present invention will become apparent from the following description taken in conjunction with one preferred embodiment thereof with reference to the accompanying drawings.

Before the description of the present invention proceeds, it is to be noted that like parts are designated by like reference numerals throughout the accompanying drawings.

Referring to FIG. 1, in accordance with one preferred embodiment of the present invention, an electric remote control back-mirror assembly for an automobile is shown as accommodated with a mirror housing 21 of a generally bowl-like shape having an opening 22. The mirror housing 21 of the mirror assembly including an adjusting device for the angular movement of the back-mirror is adapted to be rigidly mounted in any known manner on, for example, the top of a front fender of an automobile body structure (not shown) through a support leg 23 with the opening 22 facing towards a driver's seat inside the automobile body structure.

Figure 1:
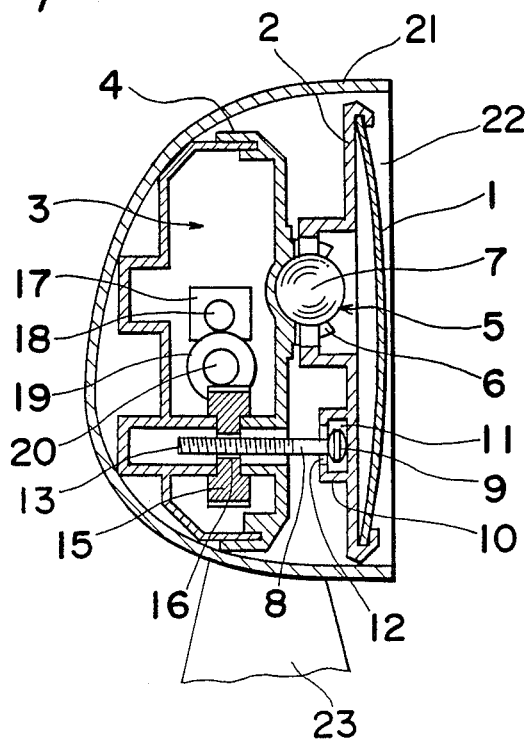
FIG. 1 is a cross-sectional view of a back-mirror assembly according to one preferred embodiment of the present invention.

The back-mirror assembly comprises a mirror 1, a mirror holder 2 equipped with the mirror 1, a pair of driving units each including a motor 17, gears 18 to 20, a driving gear 15, a screw rod 8 and a pair of connecting boxes or sockets 10, the driving force of the motor being transmitted through gears 15, 18 to 20 into the screw rod 8, a casing 4 accommodating the pair of driving units therein, and a spherical bearing 5 for connecting the mirror holder 2 with the casing 4. Also, the adjusting device comprises the spherical bearing 5, the pair of driving units and the pair of connecting sockets 10 each provided on the mirror holder 2, for receiving the head 9 of screw rod 8 therein. The spherical bearing 5 consists of a pivot receiver 6 provided on the casing 4 and a pivot ball 7 provided on the mirror holder 2. The pivot receiver 6 may be provided on the mirror housing 21 in place of the casing 4. The pivot ball 7 is brought into engagement with the pivot receiver 6 so that the mirror holder 2 is freely inclined within the casing 4 around the pivot ball 7. The mirror holder 2, spherical bearing 5, and casing 4 are accommodated within the mirror housing 21 which is, through the leg 23, mounted at a given position on the automobile body structure.

The pair of connecting sockets 10 are integrally provided on the rear surface of the mirror holder 2 and engaging with the screw rods 8, respectively, as mentioned below.

Figure 2:
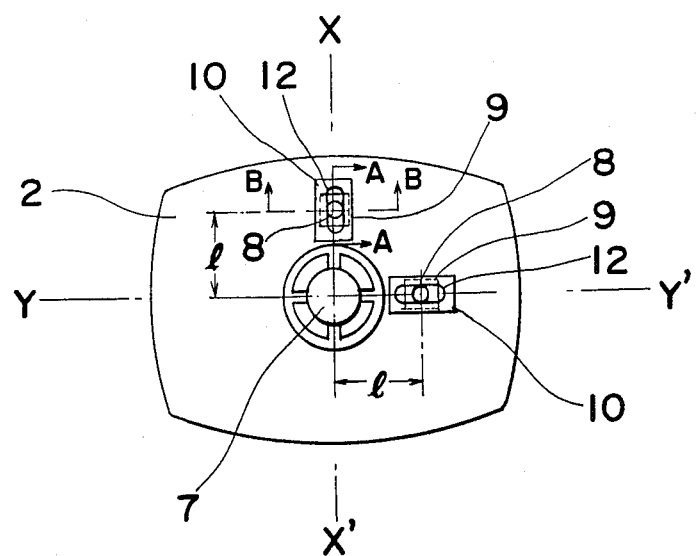
FIG. 2 is a rear-side view of a mirror holder of the assembly of FIG. 1.

The driving gear 15 comprises an outer gear to be meshed with the gear 20 and an inner female screw 16 to be meshed with a male screw portion 13 of the screw rod 8, and is rotatably retained within the casing 4 so as to bring the female screw 16 into contact with the screw rod 8 at a given position. The driving motor 17 is adapted to drive the driving gear 15 through the decelerating gears 18 and 19 and worm gear 20 so that the screw rod 8 moves along an axial direction thereof through the engagement between the driving gear 15 and the screw rod 8. Although FIG. 1 shows only one unit of these driving systems, actually there are provided two units thereof respectively with respect to the X-X' axis and the Y-Y' axis which are crossed at right angles in connection with the center of the pivot ball 7 as shown in FIG. 2. By selectively driving the driving motor 17 through a proper operation of a switch at a driver's seat, the mirror holder 2 can be inclined around the pivot ball 11 within a given range according to the position of the connecting socket 10, which is pivoted about the spherical bearing 5 by the screw rod 8 meshed with the driving gear 15 to be driven by the driving motor 17 through the gears 18 to 20, thereby adjusting the angle of the mirror 1. The screw rod 8 consists of a screw portion 13 to be meshed with and supported by the female screw 16 of driving gear 15 and a head 9 to be inserted into a connecting socket 10 provided on the mirror holder 2. The pair of the connecting sockets 10, 10 are, as shown in FIG. 2, provided respectively on the X-X' axis and the Y-Y' axis which are crossed at right angles with respect to the center of the pivot ball 7, with holding the screw rod 8 in the manner that the head 9 of the screw rod 8 is inserted into a room 11 within the connecting sockets 10, and the screw rod 8 is protruded from an opening 12 of the connecting sockets 10 to the outside.

It is to be noted here that both the room 11 and opening 12 of the connecting sockets 10 are in a rectangular shape along the direction of the X-X' axis and the Y-Y' axis, and that the head 9 of the screw rod 8 is formed in rectangular corresponding to the room 11, and, accordingly, the head 9 inserted into the room 11 may be held unrotatably and at the same time movably in relation to the mirror holder in the direction of the X-X' axis and Y-Y' axis, respectively.

Figure 3:
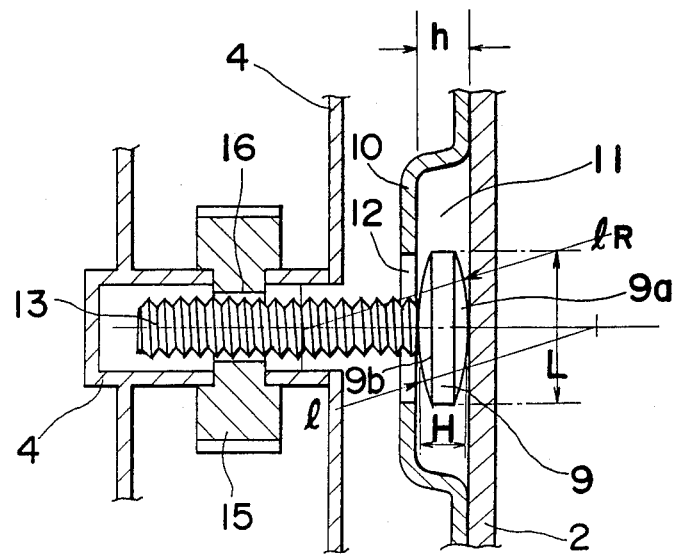
FIG. 3 is a cross-sectional view, on an enlarged scale, taken along a line A—A of FIG. 2.
Figure 4:
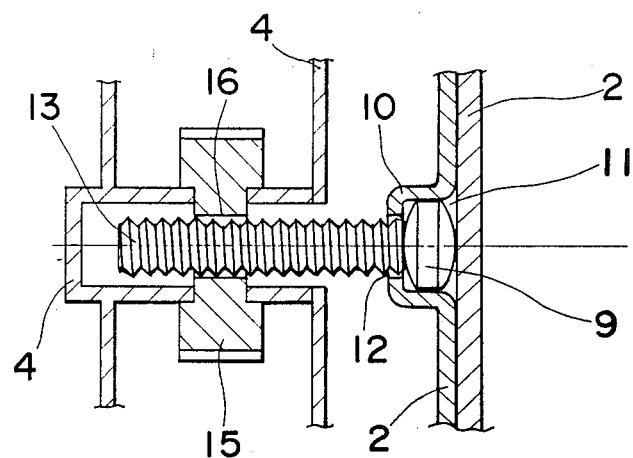
FIG. 4 is a cross-sectional view, on an enlarged scale, taken along a line B—B of FIG. 2.

For instance, in one of the connecting sockets 10 disposed on the X-X' axis, the dimensions of the head 9 are set in such a manner that the head 9 having a width L can be moved along the X-X' axis on the rear plane of the mirror holder for a certain distance within the room 11 having a length larger than that of the head 9 together with the screw portion 13 projecting through the opening 12 having a length larger than the diameter of the screw portion 13, while the head 9 cannot be moved along the Y-Y' axis on the rear plane of the mirror holder within the room 11 having a width almost equal to that of the head 9 and the opening 12 having a width smaller than that of the head 9 and slightly larger than the diameter of the screw portion 13, as shown in FIGS. 3 and 4. Also, the other of the connecting sockets 10 and the head 9 of the screw rod 8 disposed on the Y-Y' axis are construed along the Y-Y' axis with the same dimensions as those of the X-X' axis so that the head 9 can only be moved along the Y-Y' axis on the rear plane of the mirror holder.

Accordingly, the head 9 of the screw rod 8 is so provided within the rotatable angle of the mirror holder 2 in the room 11 of the connecting socket 10 with some looseness as to be freely moved in relation to the mirror holder when the mirror holder 2 rotates centering around the pivot ball 7. Therefore, when the screw rod 8 is pushed back along the axial direction thereof thereby to incline the mirror holder 2, the head 9 moves on the rear plane of the mirror holder 2 within the room 11 of the connecting socket to automatically change the connecting point thereof with the mirror holder 2, and then the screw rod 8 moves straight in the axial direction X-X' or Y-Y' even when the connecting sockets 10 move to draw a parenthesis centering the pivot ball 7. Therefore, the screw rod 8 and the driving gear 15 can be held in the condition that the respective center lines are brought into agreement with each other, and the engagement between the screw rod 8 and the driving gear 15 should always be maintained in a favorable condition.

Axially upper and lower faces 9a and 9b of the head 9 are made curved surfaces having a radius $l_R$ which is approximately the same as the average connecting distance l between the center of the pivot ball 7 and the screw rod 8 so that the screw rod 8 smoothly swings with respect to the mirror holder 2 when the mirror holder is inclined. It goes without saying that the maximum depth H between the upper and lower faces 9a and 9b is selected to be slightly smaller than the inner depth h of the room 11 of the connecting socket 10, and that the length L of the head 9 in a longitudinal direction thereof is selected to be such as required in order to surely exhibit stopping action of rotation.

Figure 5:
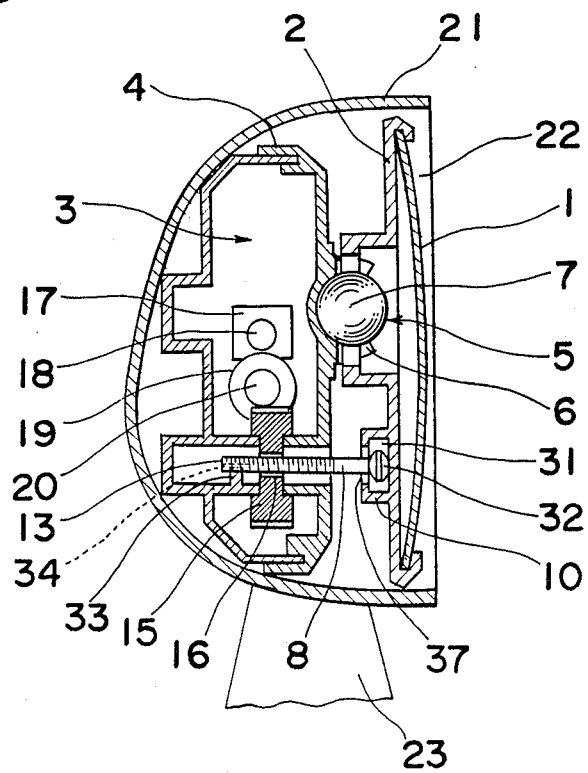
FIG. 5 is a cross-sectional view of a back-mirror assembly according to the other embodiment of the present invention.
Figure 6:
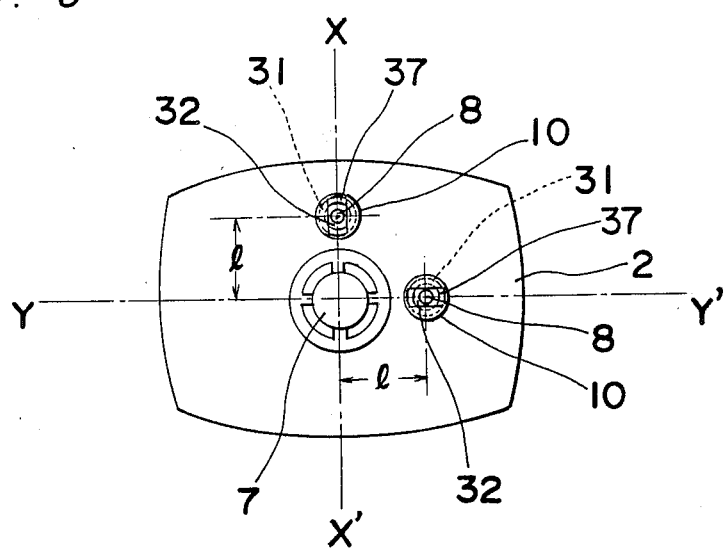
FIG. 6 is a rear side view of a mirror holder of the assembly of FIG. 5.
Figure 7:
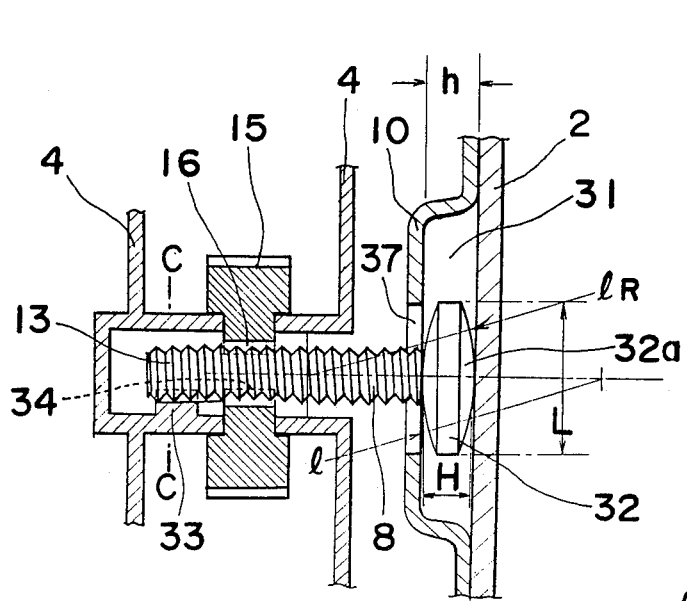
FIG. 7 is a cross-sectional view, on an enlarged scale, showing a screw rod employed in the assembly of FIG. 5.
Figure 8:
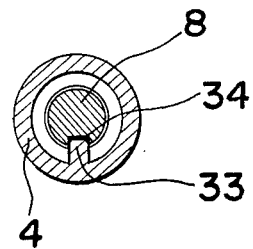
FIG. 8 is a cross-sectional view taken along a line C—C of FIG. 7.

Referring to FIG. 5 which shows the other embodiment of the present invention including components similar in many respects to those illustrated in FIG. 1, the screw rod 8 is provided with a head 32 of disk shape which can be moved along the rear face of the mirror holder 2 in a radial direction centering the spherical bearing 5 within a room 31 of the socket 10 provided on the rear face of the mirror holder 2 and having an opening 37 of an oval shape for protruding the screw portion 13 of the screw rod 8 therefrom, the room 31 being formed of circular shape for guiding the head 32 in any radial direction including X-X' or Y-Y' axes on centering the spherical bearing 5, and the screw portion 13 to be meshed with the female gear 16 of the driving gear 15 and provided with a groove 34 in the axial direction which is engaged with a projection 33 provided on the casing 4, as shown in FIGS. 7 and 8, in such a manner that the screw rod 8 can be moved along the axial direction under the guidance of the projection 33 which is slidably inserted within the groove 34 and cannot be rotated as locked by means of the projection 33 which is always in contact with a side wall of the groove 34 in the circumferential direction of the screw rod 8. Accordingly, the screw rod 8 is moved by the rotation of the driving gear 15 along the axial line thereof under the guidance of the projection 33 inserted in the groove 34, together with the socket 10 of the mirror holder 2 providing with the room 31 in which the head 32 of the screw rod 8 is accommodated to be movable along the rear face of the mirror holder 2 with centering at the pivotal point of the spherical bearing 5, so that the operation of the screw rod 8 is substantially identical to that of the screw rod 8 of FIG. 1. Also, the upper and lower faces 32a and 32b of the head 32 are made curved surfaces having a radius which is approximately the same as the average connecting distance between the center of the pivotal ball 7 and the screw rod 8 so that the screw rod 8 smoothly swings around the pivotal ball 7 with respect to the mirror holder 2 when the mirror holder 2 is inclined.

As has been described above, a mirror angle adjustment assembly according to the present invention enables, because the head of the screw rod is maintained in the connecting portion where the screw rod is connected to the mirror holder in such a manner that the head can be moved relatively to the mirror holder in a radial direction centering the spherical bearing, the respective center lines of the screw rod and the driving gear to be held in agreement with each other even when the mirror is inclined so much, and therefore no unnecessary force is added to the engaging portion, without bringing the motor into the locked condition or causing the driving systems to be slipped by operation of the clutch mechanism before the mirror is inclined to the maximum inclination position, whereby the mirror angle adjustment assembly of the present invention can always exhibit stable movement between the mirror holder and the screw rod, and the mounting of the mirror angle adjustment device will not cause the screw to move and become tilted from its horizontal orientation when the mirror is tilted and, thus, there will be no deterioration in the effectiveness of the drive connection between the screw rod and the driving gear.

Figure 9:
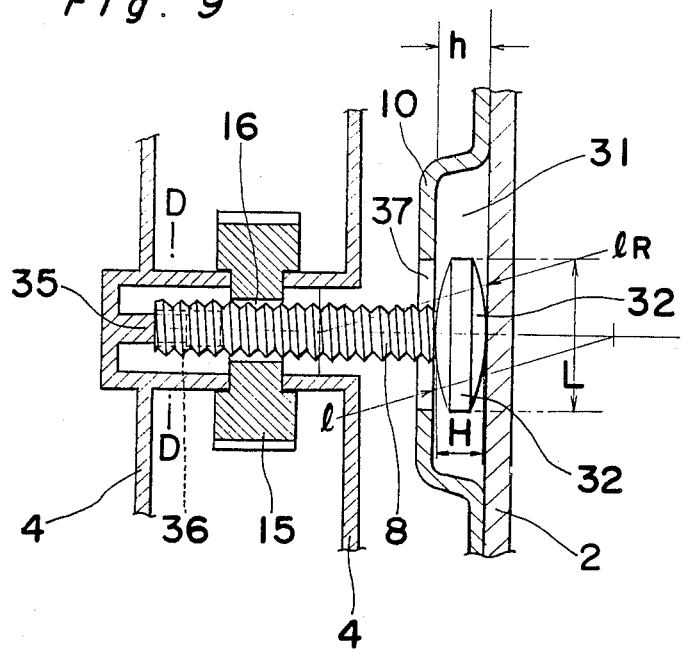
FIG. 9 is a cross-sectional view of a screw rod showing the modification of FIG. 7.
Figure 10:
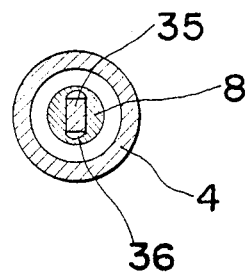
FIG. 10 is a cross-sectional view taken along a line D—D of FIG. 9.

Although the present invention has been fully described with reference to the preferred embodiment, many modifications and variations thereof will now be apparent to those skilled in the art. For instance, as shown in FIGS. 9 and 10, the projection 35 of the case may be provided with a form of plate at a position to be inserted into a hole 36 provided at the rear side of the screw portion 13 of the screw rod 8 in place of the groove 34 of FIGS. 7 and 8.

Accordingly, the scope of the present invention is limited only by the scope of the appended claims.

What is claimed is:

1. An electric remote control back-mirror assembly which comprises, in combination:
   a mirror unit including a mirror holder and a mirror supported by the mirror holder;
   a spherical mounting member for clamping the mirror holder thereon for pivotal movement around horizontal and vertical axes;
   a support member for carrying the spherical mounting member;
   a pair of sockets provided on the mirror holder in spaced relation to the spherical mounting member and spaced a predetermined angle from each other with respect to the spherical mounting member;
   a pair of rod members mounted at one end in the respective sockets against rotational and axial displacement relative to the mirror holder, said rod members protruding from the mirror holder;
   a pair of drive members rotatably supported by said support member in driving engagement with respective end portions of the rod members; and
   an electric drive means for selectively rotating the drive members to pivotally adjust the mirror unit about the spherical mounting member to adjust the angularity of the mirror unit with respect to the horizontal and vertical axes,
   each of said rod members being capable of movement relative to the mirror holder along a line to be connected between the spherical mounting member and the respective socket.

2. The electric remote control back-mirror assembly as defined in claim 1, wherein each of said rod members include a head formed on said one end thereof and where each of said sockets has a room for receiving the head of the respective rod member therein, the room and the head being formed so as to enable the displacement of each head along a line to be connected between the spherical mounting member and the respective socket, even though the rotation of each rod member around its axis and the movement of each rod member relative to the mirror holder is restricted.

3. The electric remote control back-mirror assembly as defined in claim 2, wherein said room is formed in a rectangular shape having a long and a short side, with the long side arranged parallel to a line to be connected between the spherical mounting member and each socket, while the head of each rod member is of a square shape with each side thereof being slightly smaller than the short side of the respective room.

4. The electric remote control back-mirror assembly as defined in claim 2, wherein the head of each rod member forms a curved surface to provide smooth contact with the room surface of said socket.

5. The electric remote control back-mirror assembly as defined in claim 4, wherein said curved surface of each of the heads has a radius approximately equal to the average distance between the center of the spherical mounting member and the head of the respective rod member.

* * * * *